(12) United States Patent
Novoplanski

(10) Patent No.: US 9,656,515 B2
(45) Date of Patent: May 23, 2017

(54) DEFORMABLE WHEEL ASSEMBLY

(75) Inventor: Avishay Novoplanski, Moshav Beit-Zait (IL)

(73) Assignee: GALILEO WHEEL LTD., Lod (IL)

( * ) Notice: Subject to any disclaimer, the term of this patent is extended or adjusted under 35 U.S.C. 154(b) by 1038 days.

(21) Appl. No.: 13/576,587

(22) PCT Filed: Feb. 1, 2011

(86) PCT No.: PCT/IL2011/000115
§ 371 (c)(1),
(2), (4) Date: Oct. 19, 2012

(87) PCT Pub. No.: WO2011/092709
PCT Pub. Date: Aug. 4, 2011

(65) Prior Publication Data
US 2013/0033099 A1 Feb. 7, 2013

Related U.S. Application Data

(60) Provisional application No. 61/300,159, filed on Feb. 1, 2010, provisional application No. 61/359,161, filed on Jun. 28, 2010.

(51) Int. Cl.
*B60B 9/00* (2006.01)
*B60B 19/00* (2006.01)
(Continued)

(52) U.S. Cl.
CPC ............... *B60B 9/00* (2013.01); *B60B 19/00* (2013.01); *B60C 7/10* (2013.01); *B60C 7/14* (2013.01);
(Continued)

(58) Field of Classification Search
CPC .... B60B 9/00; B60B 9/02; B60B 9/04; B60B 9/06; B60B 9/08; B60B 9/10; B60B 9/12;
(Continued)

(56) References Cited

U.S. PATENT DOCUMENTS 1,462,440 A * 7/1923 Bauman ................. 152/282
1,832,405 A * 11/1931 Mayer ..................... 152/248
(Continued)

FOREIGN PATENT DOCUMENTS

CN 1729110 A 2/2006
CN 101239639 A 8/2008
(Continued)

OTHER PUBLICATIONS

European Search Report EP14188573 dated Mar. 9, 2015.
Office Action dated Jun. 19, 2015, in corresponding application No. EP 12818321.

*Primary Examiner* — Kip T Kotter
(74) *Attorney, Agent, or Firm* — Browdy and Neimark, PLLC

(57) ABSTRACT

A locomotion assembly is provided, suitable to be used in a vehicle. The locomotion assembly comprises a frustum-conical structure comprising at least one flexible member having a frustum-conical surface extending between its relatively narrow and wide ends along a frustum-conical axis, the frustum-conical member being reversibly deformable from its biased rounded shape corresponding to a frustum-conical shape in which its side elevation is circular into a deformed frustum-conical shape in which its side elevation is non-circular. The frustum-conical structure may serve for supporting at least one surface-engaging member convertible between a round wheel-like configuration, in which its side elevation is substantially circular, and a deformed configuration, in which its side elevation is non-circular and in which a larger portion of the surface-engaging member is in contact with a movement surface.

27 Claims, 18 Drawing Sheets

(51) Int. Cl.
*B60C 7/10* (2006.01)
*B60C 7/14* (2006.01)

(52) U.S. Cl.
CPC ... *B60B 2310/302* (2013.01); *B60B 2310/305* (2013.01); *B60B 2310/316* (2013.01); *B60B 2360/10* (2013.01); *B60B 2360/32* (2013.01); *B60B 2360/50* (2013.01); *B60Y 2200/221* (2013.01)

(58) Field of Classification Search
CPC .. B60B 19/00; B60C 7/10; B60C 7/14; B60C 5/008
USPC .......................................................... 152/155
See application file for complete search history.

(56) References Cited

U.S. PATENT DOCUMENTS

| | | | | |
|---|---|---|---|---|
| 2,331,024 | A | * | 10/1943 | Griffith ..................... 152/84 |
| 2,463,226 | A | * | 3/1949 | Walden ..................... 152/47 |
| 2,491,698 | A | * | 12/1949 | Walden ..................... 152/49 |
| 2,798,525 | A | * | 7/1957 | Albrecht-Wolf ............ 152/49 |
| 3,394,751 | A | | 7/1968 | Sidles et al. |
| 3,400,746 | A | | 9/1968 | Heimovics |
| 3,457,981 | A | | 7/1969 | Verdier |
| 3,590,897 | A | | 7/1971 | Bragdon |
| 3,698,461 | A | | 10/1972 | Markow |
| 3,805,868 | A | | 4/1974 | Tangorra |
| 3,840,060 | A | | 10/1974 | Tangorra |
| 4,137,960 | A | * | 2/1979 | Cataldo .................. B60C 17/04 152/155 |
| 4,308,907 | A | | 1/1982 | Monzini |
| 4,739,810 | A | | 4/1988 | Markow |
| 6,422,576 | B1 | | 7/2002 | Michaeli et al. |
| 7,281,558 | B2 | | 10/2007 | Merino Lopez |
| 7,334,850 | B2 | | 2/2008 | Spector et al. |
| 7,547,078 | B2 | | 6/2009 | Spector et al. |
| 7,726,371 | B2 | | 6/2010 | Morrison |
| 2004/0140708 | A1 | | 7/2004 | Bott et al. |
| 2008/0197695 | A1 | | 8/2008 | Uemura |
| 2009/0173421 | A1 | * | 7/2009 | Love et al. .................. 152/246 |

FOREIGN PATENT DOCUMENTS

| | | | |
|---|---|---|---|
| DE | 209209 | C | 4/1909 |
| DE | 1073332 | | 10/1956 |
| DE | 2135960 | A1 | 2/1973 |
| DE | 2135960 | C | 2/1973 |
| DE | 66733 | C | 2/1982 |
| DE | 29702598 | U1 | 4/1997 |
| EP | 0858760 | A1 | 8/1998 |
| GB | 1380267 | | 1/1975 |
| GB | 2065040 | A | 6/1981 |
| JP | 2001121929 | A | 5/2001 |
| JP | 2003136921 | A | 5/2003 |
| JP | 2010519128 | A | 6/2010 |
| NL | 41125 | C | 2/1937 |
| WO | 03001957 | A1 | 1/2003 |
| WO | WO 2005063505 | A1 * | 7/2005 |

* cited by examiner

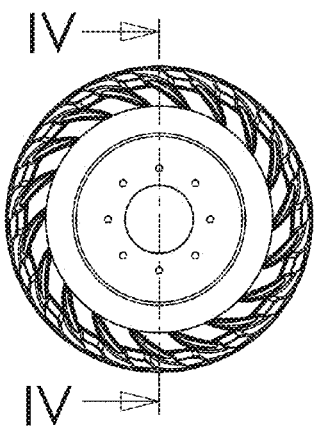 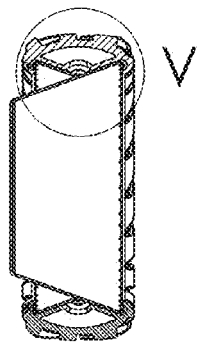 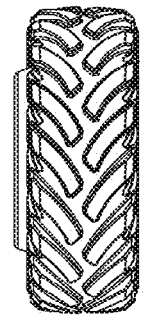
Fig. 4A  Fig. 4C  Fig. 4B
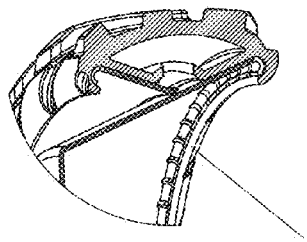 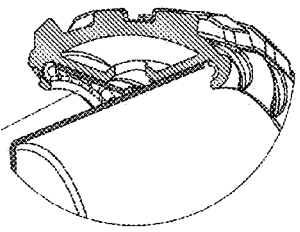 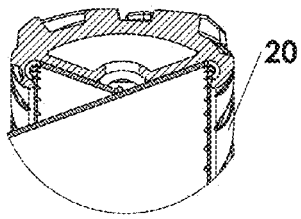
Fig. 5C  Fig. 5B  Fig. 5A

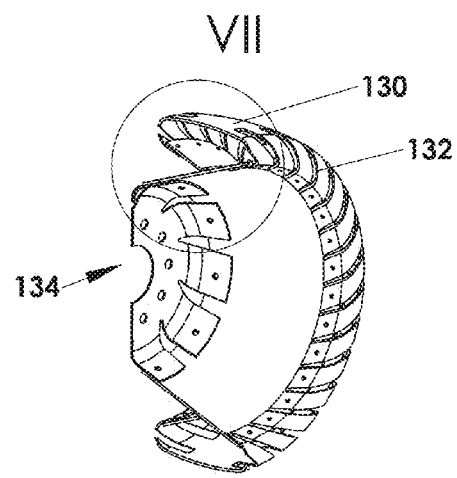
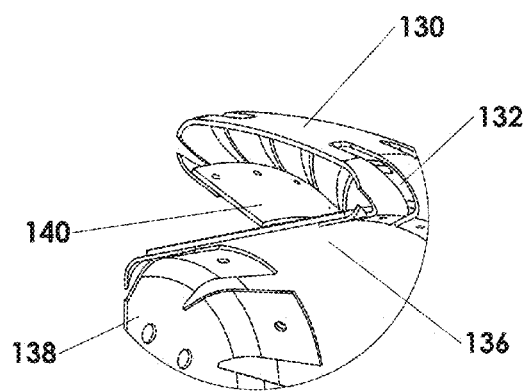
Fig. 7A
Fig. 7B
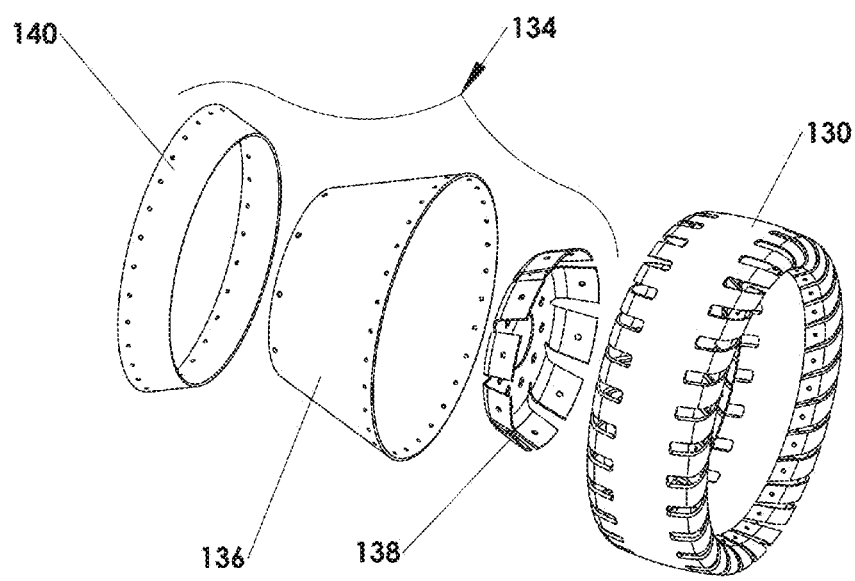
Fig. 7C

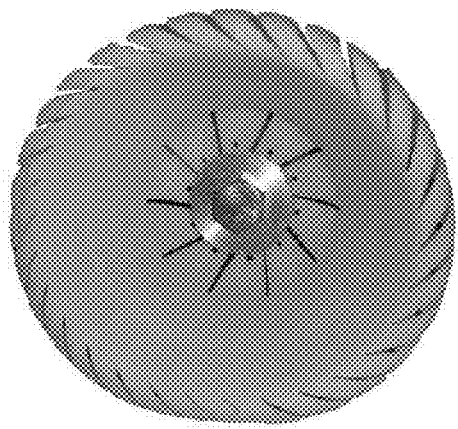
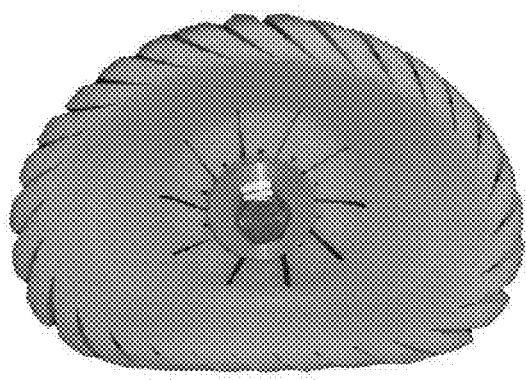
Fig. 8A　　　　　　　　　　　Fig. 8B
Fig. 9A　　　　　　　　　　　Fig. 9B

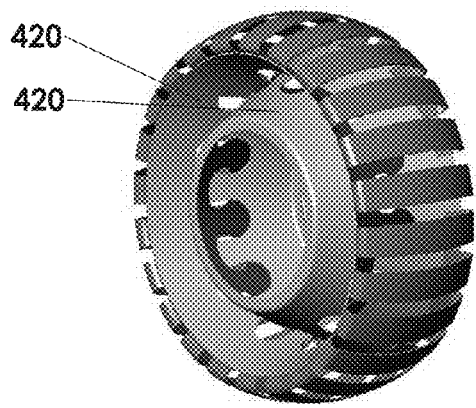
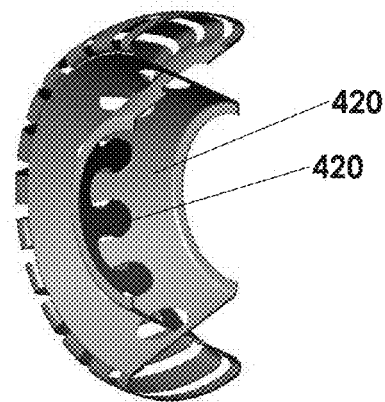
Fig. 14A  Fig. 14B
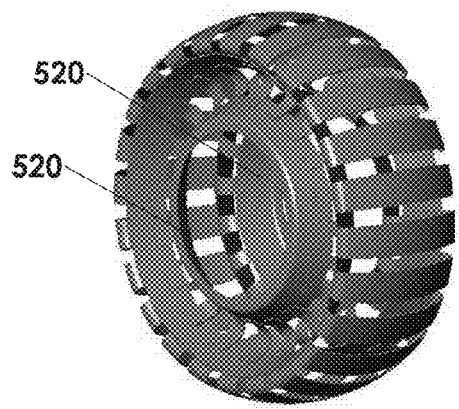
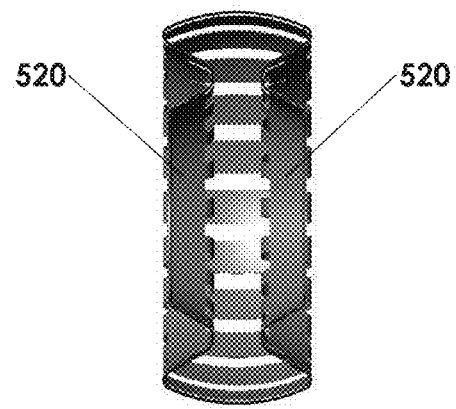
Fig. 15A  Fig. 15B

DEFORMABLE WHEEL ASSEMBLY

FIELD AND BACKGROUND OF THE INVENTION

This invention relates to a locomotion assembly, in particularly a locomotion assembly for a vehicle, of the kind that can assume a rounded, wheel-like configuration and a more flattened, belt like configuration.

Locomotion assemblies that comprise members that can assume a wheel-like configuration, on the one hand, and a caterpillar-like configuration, on the other hand are known. Some examples of such assemblies are described in U.S. Pat. Nos. 3,698,461, 6,422,576, 7,334,850, 7,557,078; and are also described in U.S. Pat. Nos. 7,334,850 and 7,547,078, both assigned to the assignee of the present application.

GENERAL DESCRIPTION

The present invention provides a novel locomotion assembly which can be used for propelling a surface vehicle.

According to the invention, the locomotion assembly comprises at least one, or preferably a pair of flexible members, each having a frustum-conical surface extending between its relatively narrow and wide ends along a frustum-conical axis.

A frustum-conically shaped configuration has a flat pattern projection (2D projection), i.e. the surface of said frustum-conical member can be opened/unfolded into a planar topology. A frustum-conical geometry is known as that defining a frustum-conical surface extending between relatively large and small circular bases on parallel planes, thus defining a frustum-conical axis. It should be understood that a true geometric frustum-conical shape having flat pattern projection is fundamentally different from any conoid shaped body having no such planar projection in its behavior while being deformed (in response to a force applied to its surface) from its original state in which it has circular cross section and its deformed state in which it has non-circular (oval-like) cross section. Moreover, this difference is more essential when dealing with flexible but substantially non-stretchable materials, which is the case in locomotion assemblies. Indeed, when such a flexible and non-stretchable element has a pure cone shape or a part thereof (i.e. frustum-conical shape), deformation of this element from its original structure results in that the cone bends, while with a similar material composition element having any other conoid shape (which has no flat 2D projection) such bending would be practically impossible. A shape having no flat 2D projection provides higher rigidity on the cost of flexibility, and vice versa for a shape having a flat 2D projection such as a frustum-conical shape. A force of a given profile applied to a pure cone-shape body and a conoid-shape body would cause significantly high stress at different points at the conoid-shape body than at the pure cone body, thus periodic application of stress (as typically happens when rolling as a wheel of a vehicle for example) would result in significantly higher material fatigue and heat buildup in the conoid-shape body, as may.

It should be noted that the frustum-conical member used in the locomotion assembly of the present invention is flexible such that it is reversibly deformable from its biased rounded shape (being true frustum-conical one) in which its side elevation is circular into a more flattened shape (deformed frustum-conical shape) in which its side elevation is non-circular. The frustum-conical member however is rigid in the meaning that it is non-extendable in its circumferential dimension. Thus, the frustum-conical member is made of non-stretchable flexible sheet.

The paired frustum-conical members are rotatable about a common axis coinciding with their frustum-conical axes, and arranged in a substantially symmetric manner. In this connection, it should be noted that, for the purposes of the present application, a "substantially symmetric arrangement" of the frustum-conical members should be interpreted broader than bilateral or mirror symmetry. The paired frustum-conical members are referred to as "substantially symmetrically identical" or as arranged in a "substantially symmetric" fashion, in the meaning that they are oppositely oriented with a common axis (they face each other either by their wide ends or by their narrow ends), and they are either identical or have similar geometry, i.e. being parts of congruent cones. Thus, the frustum-conical members of a pair have equal conical angles, and may for example have equal geometry (dimensions) at their wide ends, and the same or different heights (i.e. lengths along their axes) and accordingly the same or different geometry (dimensions) at their narrow ends.

Also, it should be noted that the frustum-conical member may be formed by a single element having a frustum-conical surface or by multiple elements defining together said frustum-conical surface.

The frustum-conical members of a pair are assembled inversely (oppositely oriented), and forces of any type (e.g. driving forces) applied to the surface of one such member to roll in a radius around its geometric vertex are balanced by the same forces applied from the opposite member, resulting in that an assembly formed by such pair of to inverted frustum-conical members rolls in a straight line (i.e. perpendicular to the frustum-conical axis). By coupling such assembly of the paired frustum-conical members to a wheel would result in the wheel movement along a line perpendicular to the wheel axis (i.e. a straight line).

The two frustum-conical members of a pair may be arranged in different ways, provided the two members are concentrically arranged and oppositely oriented. In some examples, they are arranged in a spaced-apart relationship along the common axis, for example, such that their narrower or wider bases are coinciding (as a 'back' to 'back' or 'face' to 'face' arrangement). In another example, each of the frustum-conical members includes a patterned portion of its frustum-conical surface formed by an array of slits (receptacles, grooves, cavities or bores) spaced by rigid spikes along its circumference at the side by which it faces the other member, thus formatting a grid and enabling one frustum-conical member to engage with (penetrates into) the other in conjunction, so there is no contact between the walls of the frustum-conical members. In yet another example, two frustum-conical members are configured such that each of them is divided into two parts in manner that there is no such region where segments of one frustum-conical member pass into the other frustum-conical member, but rather a small part of one member is coupled in a partial flexible manner to a larger part of the other oppositely oriented member. Generally speaking the configuration of a structure formed by a pair of frustum-conical members is such that an external circumferential part of the structure executes coupling between the two oppositely oriented frustum-conical members, via their common axis.

The frustum-conical structure formed by at least one or preferably by a pair of the above-described frustum-conical members may serve as a support structure for supporting at least one surface-engaging member of the locomotion assembly. The surface-engaging member is convertible between a round wheel-like configuration, in which its side elevation is substantially circular, and a deformed configuration, in which its side elevation is non-circular and in which a larger portion of the surface-engaging member is in contact with the surface of movement (e.g. ground).

To facilitate understanding, a surface of movement will be referred to herein as ground, but it should be understood that the invention is limited neither to a ground movement of a locomotion assembly nor to a movement along any solid surface.

The surface-engaging member has typically an outer surface by which it contacts the surface of movement, such that in the deformed state of the surface-engaging member, said outer surface thereof maintains the substantially parallel orientation with respect to the surface of movement.

Considering a pair of the frustum-conical support members, the configuration may be such that they, by their wide ends, support the same or separate surface-engaging members. Thus, when the frustum-conical structure is mounted in the locomotion assembly, each of the frustum-conical members, at the wide end of its frustum-conical surface, may be is coupled to the surface-engaging member, such that the paired support members are coupled to the same surface-engaging member or two different surface-engaging members. The arrangement is such that a bias of each of the frustum-conical members of a pair to move in a non-linear direction (and thus induce the surface engaging member to move in a non-linear direction) is offset by the other frustum-conical member of the pair.

The frustum-conical structure described above may by itself form a wheel, namely the wide ends of the frustum-conical members of a pair may present a ground-engaging surface of the wheel. In another embodiment, a wheel may comprise an inflatable rubber tire defining an enclosed fluid-pressure holding space with a circumferential surface-engaging member; and a support structure integrally formed in the wheel and comprising the above-described frustum-conical structure formed by at least one pair of oppositely oriented frustum-conical support members of equal conical angles, each defining a frustum-conical surface extending between relatively narrow and wide ends of the support member along a frustum-conical axis, each of the support members being coupled at the wide end of the frustum-conical surface to one side of the surface-engaging member opposite that of the other, each support member being made from a rigid material and being flexible and biased into rounded shape in which its side elevation is circular and being reversibly deformable into a more flattened shape in which its side elevation is non-circular. The deformation of the support structure permits the reversible deformation of the surface-engaging member from a substantially circular shape to a deformed shape in which a larger portion of a ground-engaging surface is in contact with a movement surface.

Thus, the frustum-conical structure of the invention, formed by at least one or preferably at least one pair of frustum-conical support members, links the surface-engaging member(s) and a vehicle's axle, transferring a force from the vehicle's axle to the surface-engaging member. The flexible support members are reversibly deformable from their natural, frustum-conical shape (in which they have a substantially circular cross-sectional shape) into a deformed, somewhat flattened shape in tandem with the conversion of the surface-engaging member(s) from the round configuration to the deformed non-circular configuration. Through its flexibility, said linking support structure can translate or link between a circular motion at the axle to a non-circular, caterpillar-like motion of the surface-engaging member in which a segment thereof is in contact with the surface of movement (e.g. ground).

By an embodiment of the invention there is provided a locomotion assembly for a vehicle that comprises a flexible surface-engaging member and a flexible support structure. The flexible surface-engaging member has wheel-like, essentially circular configuration with its outer surface which may be rigid, pliable or flexible. The support structure is configured as described above, comprising at least one pair of symmetrically arranged frustum-conical shaped support members defining together a common longitudinal axis that is substantially horizontally oriented. The first wide end of the support member is linked to the surface-engaging member and the second narrow end is rotationally fixed to an axle of the vehicle to permit rotation about said longitudinal axis. Said support structure and said surface-engaging member are flexible and reversibly deformable between the wheel-like configuration and a non-circular configuration in which a stretch of said surface-engaging member is essentially parallel to the ground and in contact therewith.

In accordance with an embodiment of the invention the locomotion assembly is intrinsically biased to assume a circular configuration. The locomotion assembly may, in accordance with an embodiment of the invention, become deformed to assume a non-circular configuration in response to a load on said axle.

In accordance with an embodiment of the invention an actuating arrangement is provided for forcing the locomotion assembly to assume one of its configurations. An example of such an actuating arrangement is a pneumatic one in which the gas pressure within an enclosure biases the locomotion assembly to assume a wheel-like configuration, while a lowering of the gas pressure permits the locomotion assembly to assume a non-circular configuration. Such enclosure, by an embodiment, is annular.

A locomotion assembly according to an embodiment of the invention comprises a flexible ground-engaging member having a wheel-like, essentially circular configuration with a ground-engaging surface with a first rim and a second rim corresponding to a first side and second side of the locomotion assembly. The locomotion assembly of this embodiment comprises a flexible support structure with a first support arrangement and a second support arrangement, each having a frustum-conical shape when the ground-engaging member has a wheel-like configuration. Each of the support arrangements extends between a respective first end and a second end of narrower diameter, and both define by their frustum-conical axes a common longitudinal axis substantially horizontally oriented. The first end of one of the support arrangements is linked to a first rim of the ground-engaging surface and the first end of the other is linked to the second rim of the ground-engaging surface. The support structure and the ground engaging member are flexible and reversibly deformable between the wheel-like configuration in which the support arrangements have the frustum-conical shape and a non-circular configuration in which a stretch of said surface-engaging member is essentially parallel to the ground and in contact therewith and the support structure has a deformed frustum-conical configuration.

Also in the case of this embodiment, the locomotion assembly may be intrinsically biased to assume a circular configuration. Also, it may be deformable to assume a non-circular configuration in response to a load on said axle. Alternatively, or in addition, the locomotion assembly may also comprise an actuating arrangement for forcing the locomotion assembly to assume one of its configurations. An example of an actuating arrangement is a pneumatic one. A pneumatic actuating arrangement typically comprises an enclosure (usually annular) for compressed gas, wherein the pressure of the gas controls the configuration of the locomotion assembly. For example, a high gas pressure may bias the locomotion assembly to assume a wheel-like configuration and a lowering of the gas pressure permits the locomotion assembly to assume a non-circular configuration.

As indicated above, the two frustum-conical support members/arrangements of the support structure have opposite symmetric orientation. Typically, there support arrangements are linked to an axial hub at their second ends.

By one embodiment of the invention, each of the support arrangements comprises a plurality of rigid spikes. The rigid spikes may define together a mid-portion of the support arrangement linking between first and second end portions thereof. Typically, the first support arrangement extends between the first rim of the ground-engaging member to the second side of the locomotion assembly and the second support arrangement extends between the second rim of the ground-engaging member to the first side of the locomotion assembly, the frustum-conical axes of the two support arrangements crossing one another at said mid-portion.

By an embodiment of the invention, the first portion of each of the two support arrangements is integral with the second portion of each of the other of the two support arrangements. The locomotion assembly may thus comprise a circular, substantially V-shaped groove formed one at each side of the locomotion assembly. Such groove is defined by a first, more peripheral wall and a second, more central wall. The first wall constitutes the first portion of one support arrangement and the second wall constituting a second portion of the other support arrangement.

By an embodiment of the locomotion assembly, at least one, typically both the first segments of each of the support arrangements is integral with the ground-engaging member.

By an embodiment of the locomotion assembly the first and second portions comprise an elastomer.

The locomotion assembly, by an embodiment, comprises rigid spikes linking the first and the second portions and received in appropriate receptacles (grooves, cavity or bores) defined in the first and second portions.

It should be understood that the frustum-conical support structure may be configured from two or more elements made form any suitable material, iron or polymer for example.

A locomotion assembly, according to another embodiment, comprises a flexible, elastomeric ground-engaging member having wheel-like, essentially circular configuration with a ground-engaging surface with a first rim and second rim corresponding to a first side and a second side of the wheel; and a flexible support structure. The latter comprises a first support arrangement and a second support arrangement. Each comprises a first elastomeric portion integral with the ground engaging member and a second elastomeric portion at second end, and comprising a plurality of rigid spikes defining a mid-portion, each of the spikes being tightly received within a receptacle defined in the first and second portions. The first support arrangement extends between said first rim to the second side of the locomotion assembly and the second support arrangement extends between said second rim to the first side of the locomotion assembly. The two support arrangements have a frustum-conical shape and cross one another at said mid-portion. The first portion of each of the support arrangements is integral with the second portion of the other support arrangement. The locomotion assembly is reversibly deformable between the wheel-like configuration in which the support arrangements are frustum-conical and a non-circular configuration in which a stretch of said ground-engaging member is essentially parallel to the ground and in contact therewith and the support structure has a deformed frustum-conical configuration.

The locomotion assembly of the latter embodiment also typically comprises a circular, substantially V-shaped groove formed one at each side of the locomotion assembly. The groove has a first, more peripheral wall and a second, more central wall. The first wall constitutes the first portion of one support arrangement and the second wall constituting a second portion of the other support arrangement.

By an embodiment of the locomotion assembly, there is confined space defined between the ground-engaging member, the first portions and the second portions which may or may not be filled with certain media, such as compressed gas or liquid, in which case the gas pressure controls the configuration of the locomotion assembly. Alternatively, the confined space may be filled by air from the surroundings in which case the flexibility is defined by the elasticity of the material composition of the ground-engaging member.

Also provided by the invention is a vehicle comprising the locomotion assembly of as disclosed above and below.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4A and 4B, respectively, are a side and front elevation of a locomotion assembly, in accordance with another embodiment of the invention.

FIG. 4C is a longitudinal section through lines IV-IV in FIG. 4A.

FIG. 5A is an enlarged view of the section marked V in FIG. 4C.

FIGS. 5B and 5C are isometric cross-sectional views of the section marked V in FIG. 4C.

FIGS. 7A-7C illustrate a locomotion assembly, according to another embodiment of the invention, wherein FIG. 7A is a longitudinal cross-section, FIG. 7B is an enlarged view of the section marked VII in FIG. 7A and FIG. 7C is an exploded, isometric view of the locomotion assembly.

FIGS. 8A and 8B show a model of a locomotion assembly, in accordance with an embodiment of the invention, in the respective circular and deformed configurations.

FIGS. 9A and 9B show a ground-engaging footprint of the traction assembly in the respective configurations of FIGS. 8A and 8B.

FIGS. 14A and 14B show yet another example of a wheel structure, in which the entire frustum-conical support structure is formed from a suitable resilient material, such as a sheet of steel, thus eliminating a need for an additional resilient enclosure.

FIGS. 15A and 15B show a further example of the frustum-conical structure in which the frustum-conical members of the pair are separated from one another (rather than being engaged) and thus have continuous frustum-conical surfaces (rather than having patterned portions to engage one another).

DETAILED DESCRIPTION OF EMBODIMENTS

Figure 1A:
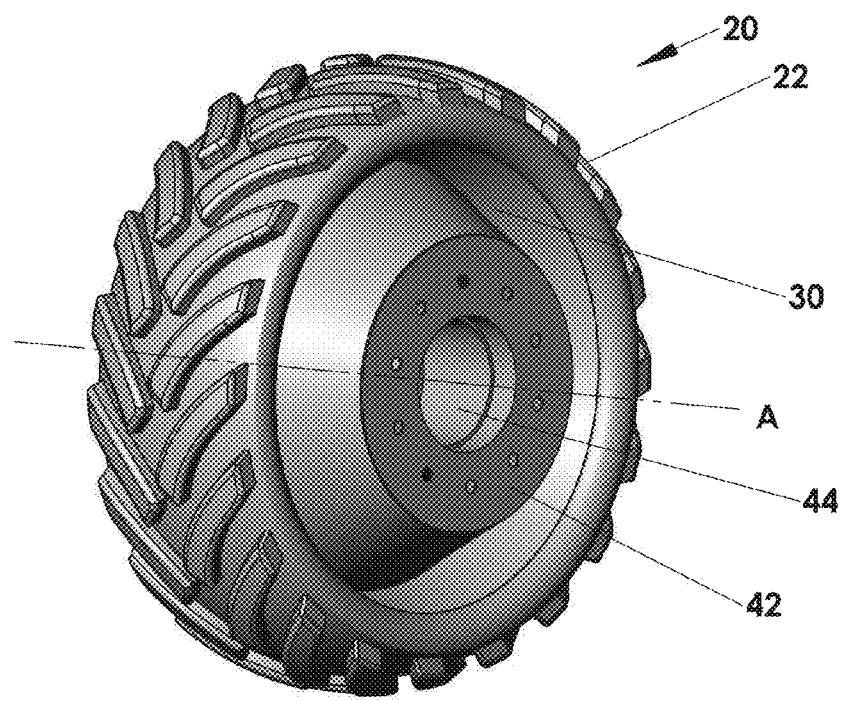
FIG. 1A is a perspective view, from one side, of a locomotion assembly in accordance with an embodiment of the invention.
Figure 1B:
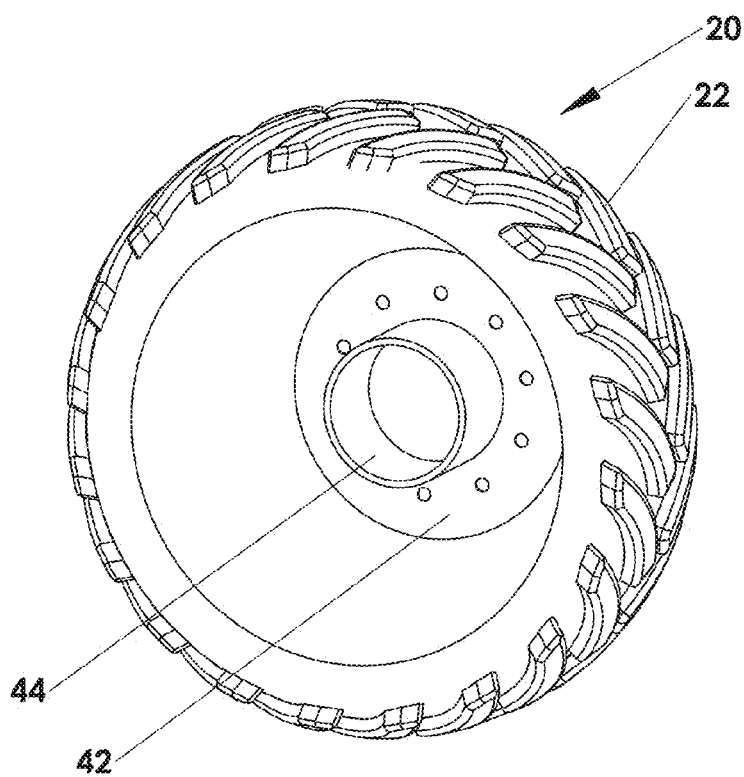
FIG. 1B is a perspective view of the locomotion assembly of FIG. 2A from its opposite, side.
Figure 1C:
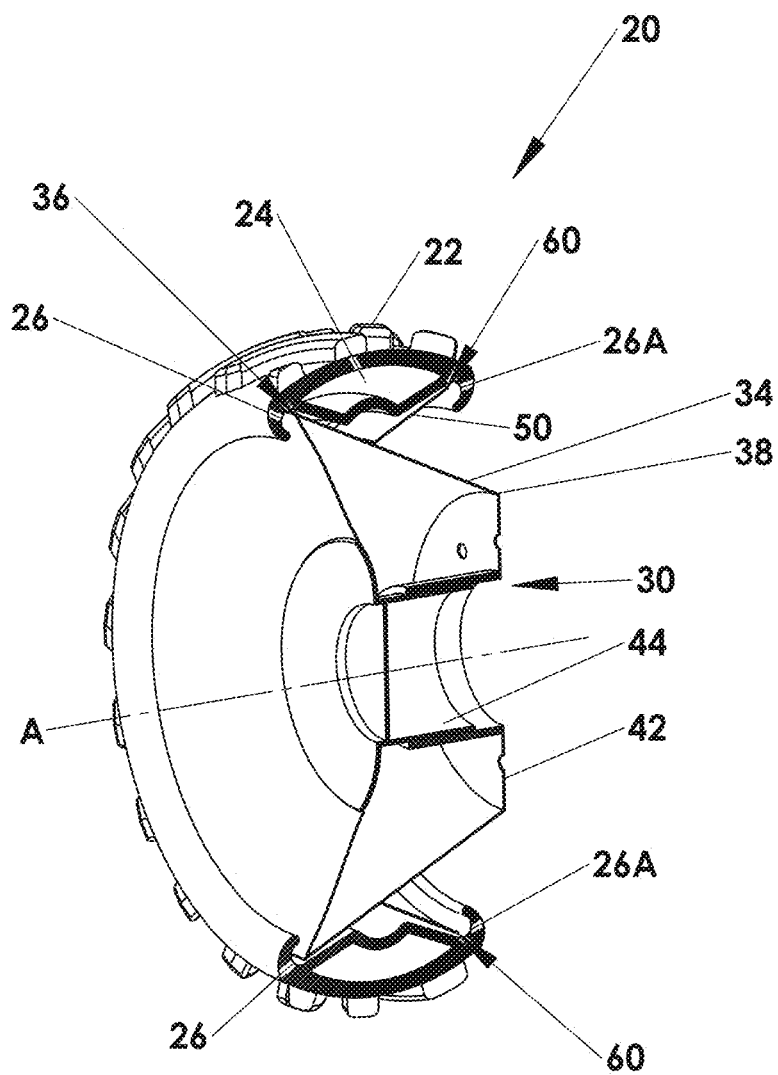
FIG. 1C is a cross-section of the locomotion assembly of FIG. 2A.

Reference is being made to FIGS. 1A-1C showing a wheel constituting a locomotion assembly 20, in accordance with an embodiment of the invention, in its circular configuration. The locomotion assembly 20 includes a frustum-conical structure 30, which in this example is associated with a ground-engaging member 22 (constituting a surface-engaging member), and serves as a support structure for supporting ground-engaging member 22. The ground-engaging member 22 has an overall structure resembling that of a tractor's tyre. As can be seen, particularly in FIG. 2C, defined below the ground-engaging member 22 defines a circumferential tight space 24. This space 24 can be inflated with compressed gas or liquid for controlling resiliency/rigidity. The ground-engaging member 22 has downward facing rims 26 and 26A, which are engaged with end portions of the support structure 30, which will be discussed below.

The support structure 30 includes at least one flexible support member 34. The member 34 has a frustum-conical surface extending between a first, relatively wide end 36 and a second narrower end 38, and defining a longitudinal axis A, which in some cases might be substantially horizontally oriented. The support member 34 may be formed by a single frustum-conical element, or by multiple support elements defining together said frustum-conical surface.

The frustum-conical structure serves as a linking structure for transferring force from a vehicle's axle to the rotation axis of the locomotion assembly. In this example, the support member 34, by its first end 36, supports the ground-engaging member 22, and serves as a linking member for transferring force from a vehicle's axle to the rotational axis of the ground-engaging member. As shown in the present example, the first end 36 is fitted within the circumferential recess defined by downward-facing rim 26. Radially-extending from the second narrower end 38 is an end plate 42 fitted with a cylindrical hub 44 which, in use, receives an axle of the vehicle (not shown). Thus, when in use the locomotion assembly rotates about axis A. The engagement of the locomotion assembly to a vehicle's axle may be from each one of the sides of the assembly.

As indicated above, the support structure 30 preferably include at least one pair of the frustum-conical support members. A second frustum-conical support member 50 of the pair is substantially symmetrically identical with the first support member 34, namely has an oppositely-oriented frustum-conical shape of the same conical angle and the same geometry of the wide end thereof, while the same or different height and accordingly the same or different geometry of the narrow end. The support members of the pair face each other either by their first (wider) ends or by their second (narrower) ends.

In this example, the support member 50 is mounted over the surface defined by its paired support member 34. An external end 60 is fitted into the groove defined by rim 26A. The first end 36 of the support member 34 and the external end 60 of the support member 50 are equally distanced from axis A. Consequently, in the configuration shown in FIGS. 1A-1C, the locomotion assembly behaves in a wheel-like fashion.

The locomotion assembly of this embodiment is self-biased to assume a cylindrical configuration with a substantially rounded, side elevation. By way of example, when a force is applied to the frustum-conical surface of the support structure (e.g. a load is applied on the axle), the locomotion assembly may assume the deformed configuration, as shown in FIGS. 2A-2C.

Figure 2A:
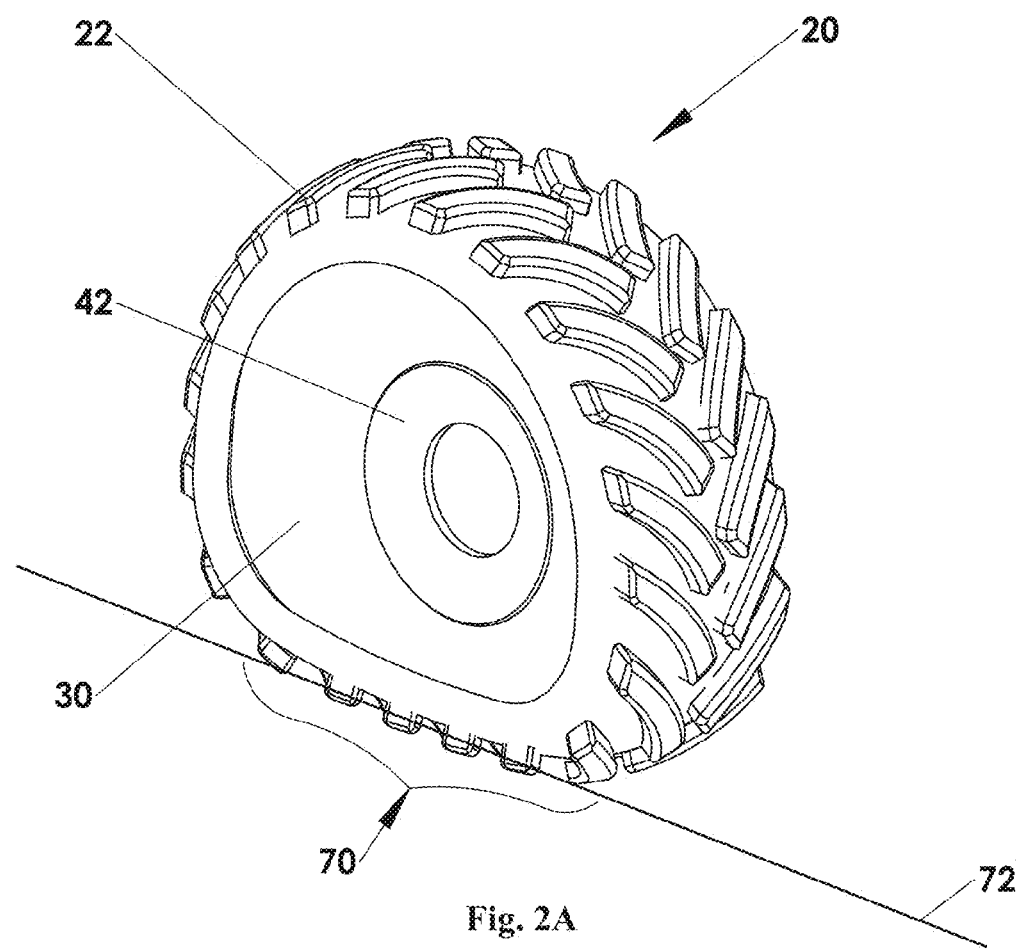
FIGS. 2A, 2B and 2C are perspective views and cross-sections corresponding to those of FIGS. 1A-1C, with the locomotion assembly in a deformed, non-circular configuration.
Figure 2B:
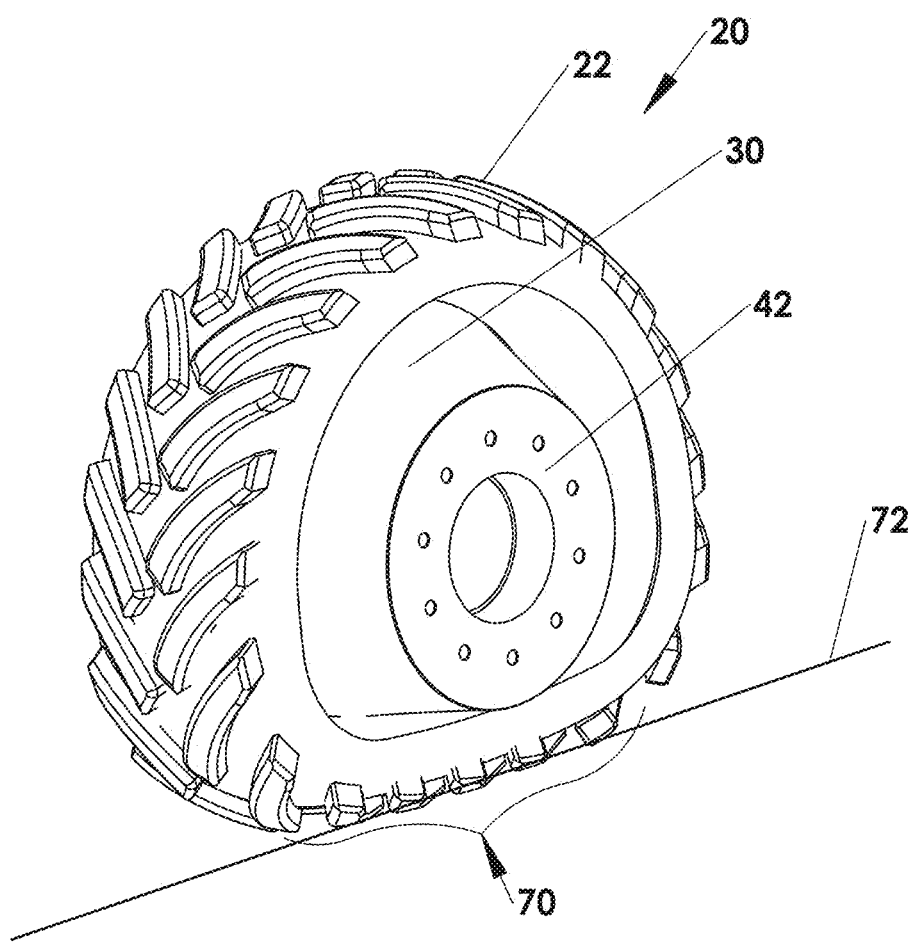
Figure 2C:
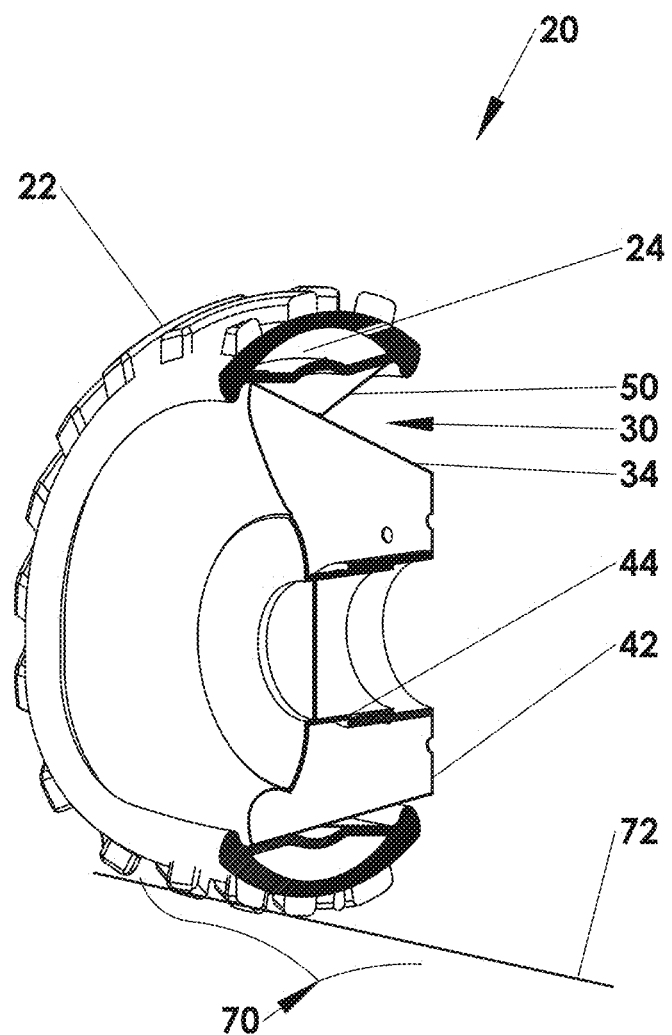

FIGS. 2A-2C show the locomotion assembly in the same views as FIGS. 1A-1C but in the deformed configuration. As can be seen, a portion 70, which bears onto the ground represented by line 72 (constituting a movement surface), is flattened and essentially parallel to the ground and in contact therewith. In this configuration, the locomotion assembly thus has a larger footprint (as illustrated in FIG. 9B), as compared to the smaller footprint in the wheel-like configuration (illustrated in FIG. 9A). Therefore, in some respects, in the deformed configuration the locomotion assembly has a caterpillar-like mode of action but without the pulleys that are needed in caterpillars.

Figure 3:
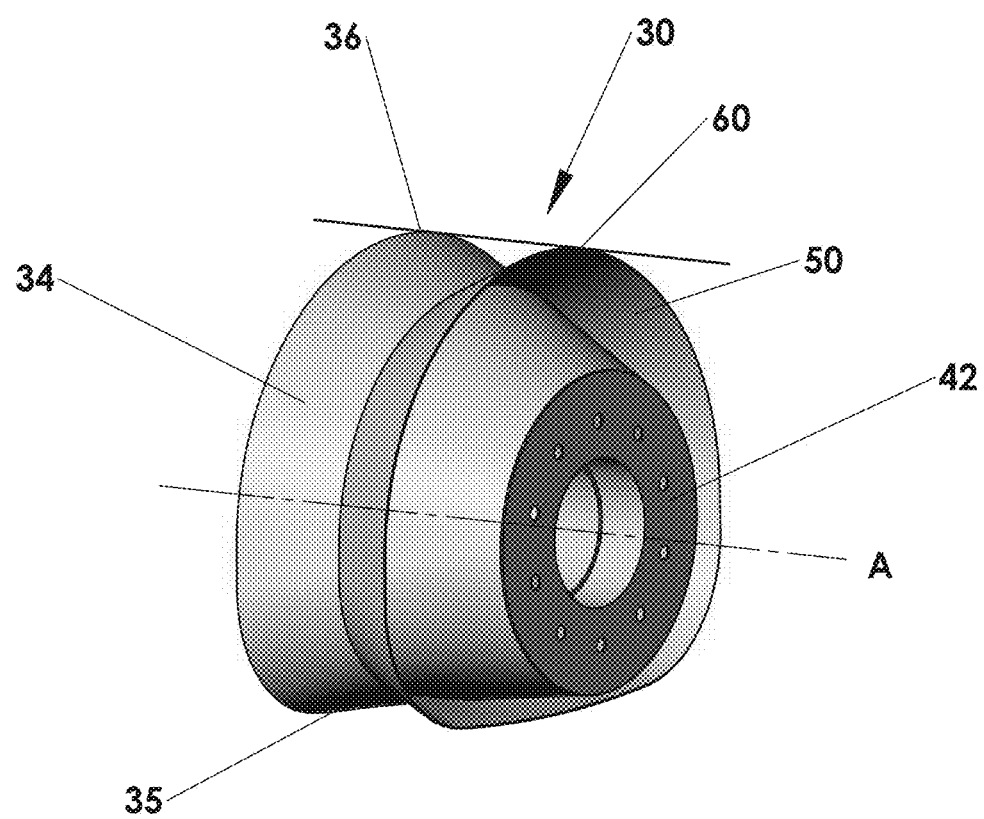
FIG. 3 shows a locomotion assembly according to an embodiment of the invention in a deformed configuration with a ground-engaging member being removed for illustrative purposes.
Figure 6C:
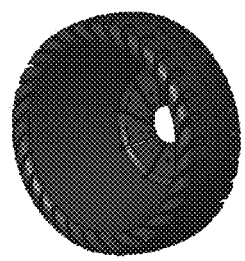
FIG. 6C shows a locomotion assembly with the actuating arrangement being removed for illustrative purposes.
Figures 6A, 6B:
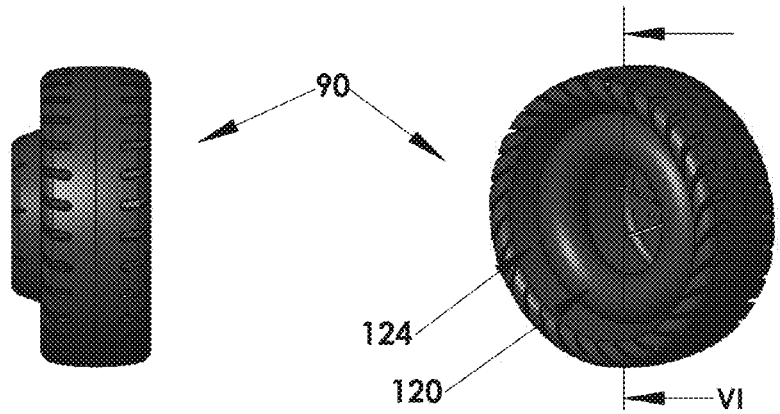
FIG. 6A is a front elevation of a locomotion assembly, in accordance with another embodiment of the invention.
FIG. 6B is an isometric view of the locomotion assembly of FIG. 6A showing an actuating arrangement, in accordance with an embodiment of the invention.
Figure 6D:
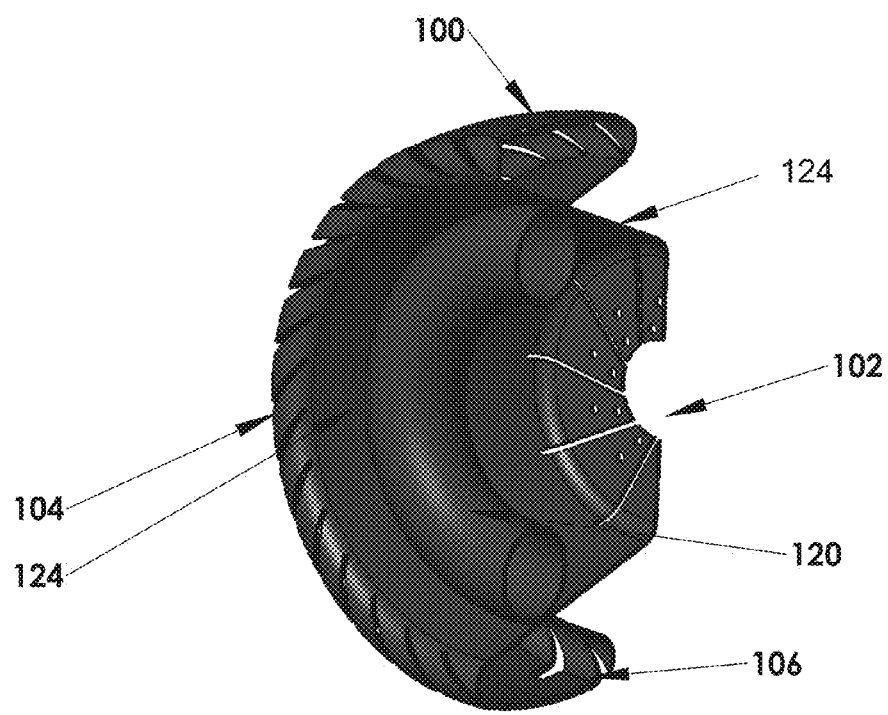
FIG. 6D is an isometric cross-section along lines VI-VI in FIG. 6C.

Reference is now made to FIG. 3 showing more specifically the support structure 30. The support structure includes oppositely oriented (symmetrically oriented) frustum-conical support members 34 and 50. As can be seen, in the deformed state, circumferential end 60 of support member 50 and first end 36 of support member 34 are both deformed.

Reference is now made to FIGS. 4A-5C showing a locomotion assembly according to another embodiment of the invention. As can be seen, the external end 36 of support member 34 and external end 60 of support member 50 are axially slit by slits 80 to improve flexibility of the entire structure.

Resiliency of the support structure 30 may be achieved in a variety of ways. By one embodiment, shown in FIGS. 1-4, this is achieved through the use of a rigid though pliable material. In other embodiments, this may be achieved through different solutions. One example is end slits 80 of the kind shown in FIGS. 5A-5C. Examples of other solutions are construction of each of the support members from several segments, articulated to one another at or about the second end. One other solution is also disclosed below. The manner of achieving such a structure is within the reach of a person skilled in the art.

Reference is now being made to FIGS. 6A-6D which show a locomotion assembly 90, according to another embodiment of the invention. In this case, rather than being a tyre-type ground-engaging member as in previously described embodiments, in this embodiment the ground-engaging member 100 is integrally formed with the support structure 102. The resiliency is imparted, among others, by the structure of the ground-engaging member, which is formed having a plurality of slits 104 extending across the ground-engaging member 100 and dividing it into a plurality of segments 106. This embodiment includes also an actuating member 120 which, in this exemplary case, is an inflatable, torus-shaped hollow body, which bears against an inside surface 124 of the support structure 102. When inflated, it imparts rigidity and hence a circular shape; and when deflated, the traction assembly can assume a deformed, flattened configuration. Actuating member 120 may by other embodiments be disposed at the opposite side of the wheel. By other embodiments it may include an arrangement with parts on opposite side of the wheel.

Another embodiment of a locomotion assembly is shown in FIGS. 7A-7C. In this case, a ground-engaging member 130 is a separately formed body that is made to be flexible by slits 132 formed in the sides of ground-engaging member 130. A support structure 134 includes a pair of symmetrically (oppositely) oriented frustum-conical support members 136 and 140, and an end member 138 being an auxiliary support member. The support members 136 and 140 have the same geometry at their first wide ends (external ends of the support structure) and equal conical angle, but in this example they have different lengths and accordingly different dimensions at their second narrower ends. As also shown in the figures, the wider ends of the support members by which they are to support the ground-engaging member define planar external surfaces of the support structure (planar bases of the support members). The auxiliary support member 138 also has a frustum-conical shape oriented similar to that of support member 136. As can best be seen in FIG. 7C the different components are assembled together and may be fitted with one another through one or more of pressure fitting, welding to one another, through knits, screws and many others.

Exemplary models of the locomotion assembly are shown in FIG. 8A in its circular configuration and in FIG. 8B in its deformed configuration. The corresponding footprints of these model embodiments are shown in FIGS. 9A and 9B, respectively.

Figure 10A:
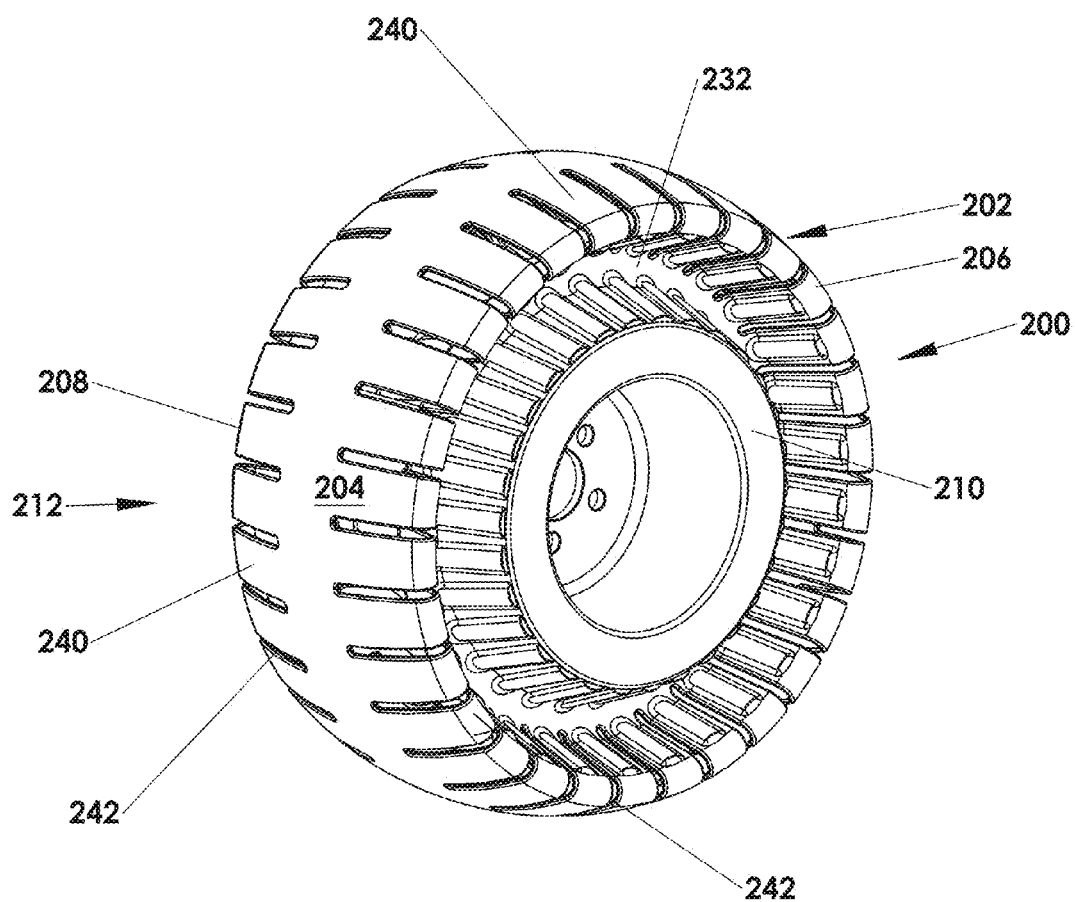
FIGS. 10A and 10B are, respectively, a perspective view and section perspective view of a locomotion assembly, in accordance with an embodiment of the invention.
Figure 10B:
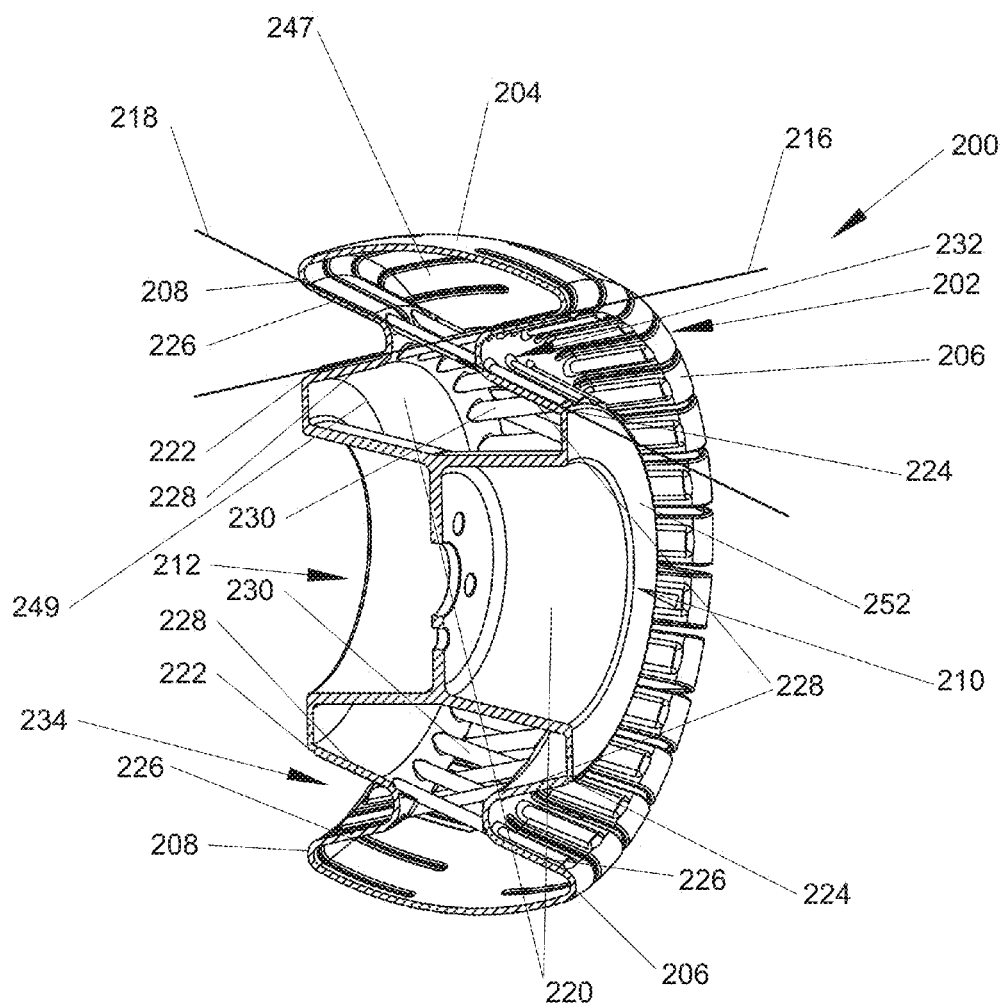

Reference is now made to FIGS. 10A and 10B showing a locomotion assembly 200 including a flexible ground-engaging member 202 with a ground engaging surface 204, and a flexible support structure 220. The locomotion assembly 200 has a wheel-like, essentially circular configuration as shown and has the flexibility to assume a flattened, non-circular configuration, with the ground-engaging surface 204 being in contact with the ground throughout an extended segment thereof (as will be explained below). The ground-engaging member 202 has first and second rims 206 and 208 at a first side 210 and second side 212 of the locomotion assembly, respectively.

The ground-engaging member 202 is supported by the flexible support structure 220 which includes two support arrangements that are both frustum-conical members made of a number of cooperating components that jointly define two, oppositely oriented frustum-conical surfaces as outlined by lines 216 and 218. These frustum-conical surfaces extend from their first ends at rims 206 and 208 to their second, narrower diameter ends 222 and 224. It should be noted that the frustum-conical arrangements have a true frustum-conical shape only in the circular, wheel-like configuration and are shifted into their deformed frustum-conical shape once the traction assembly assumes a non-circular configuration.

Each support arrangement includes a first portion 226 coupled to (integral with) the ground-engaging member 202, a second portion 228 and a mid-portion defined by a plurality of spikes 230. As can be seen, the mid-portions of the two support arrangements cross one another with the plurality of spikes 230, forming an interlacing arrangement. Further, as can also be seen, the first portion 226 and the second portion 228 are, in this specific embodiment, coupled to (integral with) one another.

As can further be seen from FIGS. 10A and 10B, formed at each of sides 210 and 212 are respective V-shaped circular grooves 232 and 234, each with walls that are defined by first portions 226 and second, integral portion 228 (of the other support arrangement).

The locomotion assembly of this embodiment is integrally formed with a rigid hub 252 for linking to a vehicle's axle.

In this specific embodiment, the entire structure is made of metal. The ground-engaging member is comprised of individual segments 240, separated from one another by cuts 242. This ensures an overall flexibility of the ground-engaging member 202. The interlacing arrangement of the two support members/arrangements imparts overall ability of radial compression; and accordingly, the ability of the entire locomotion assembly to assume a flattened, non-circular shape, with an extended portion of the ground-engaging surface 204 touching the ground and providing a more extensive locomotion surface.

By some embodiments, a tube or another resilient enclosure (not shown) may be included in either one or both of spaces 247 and 249 defined within the locomotion assembly.

Reference is now being made to FIGS. 11A-11E showing a locomotion assembly 300 according to another embodiment of the invention. Elements having the same function as in locomotion assembly 200 of FIGS. 10A and 10B are given the same reference numerals shifted by one hundred.

The main difference resides in that the locomotion assembly is made of an elastomeric material, such as rubber, for example of the kind routinely used in wheels. However, other types of materials may be used as well.

Figure 11A:
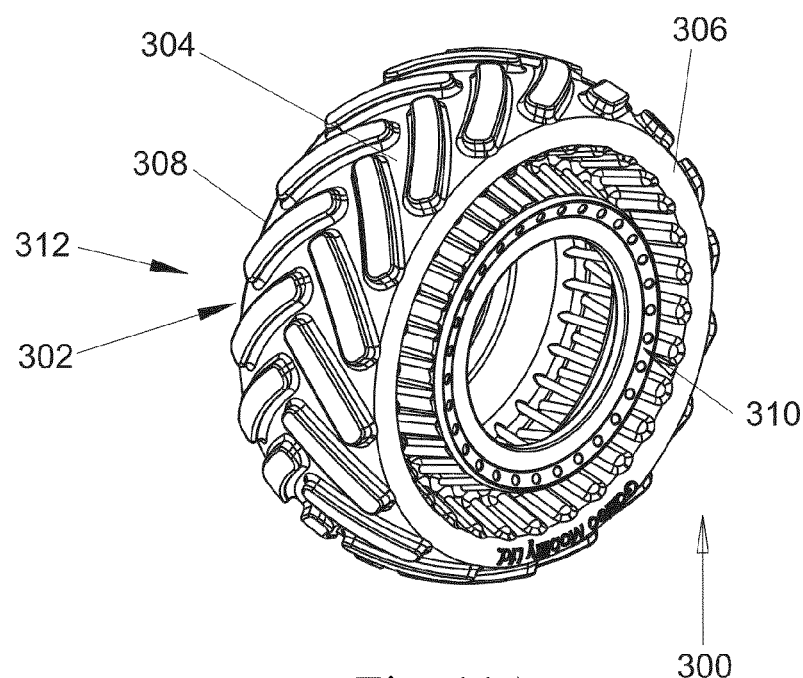
FIGS. 11A-11C are, respectively, a perspective view, a section perspective view and longitudinal cross-sectional view of a locomotion assembly, in accordance with another embodiment of the invention.
Figure 11B:
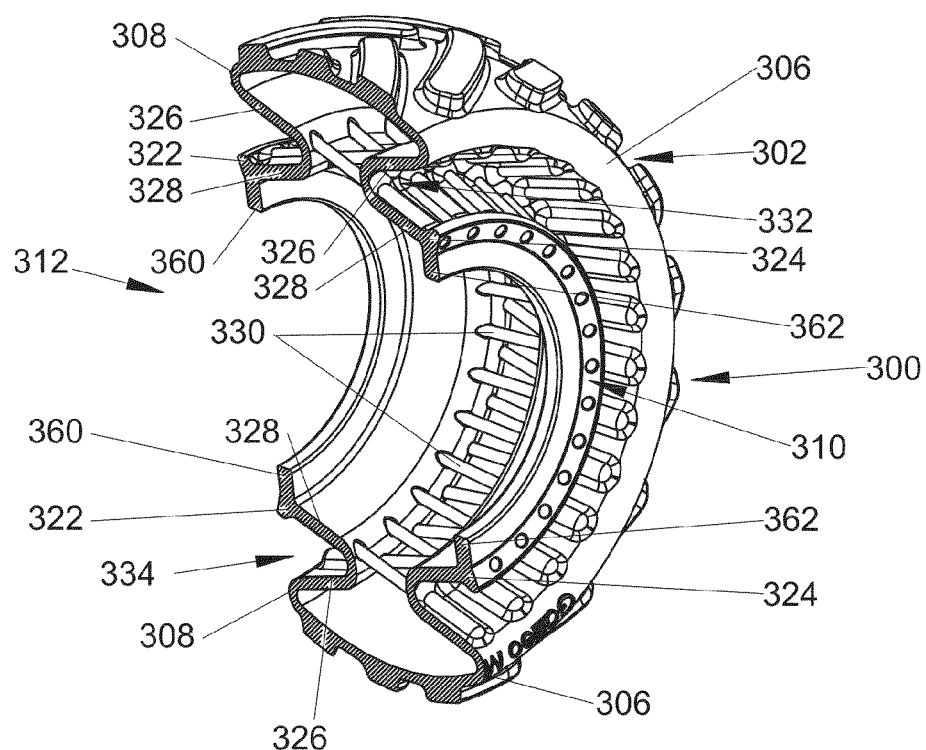
Figure 11C:
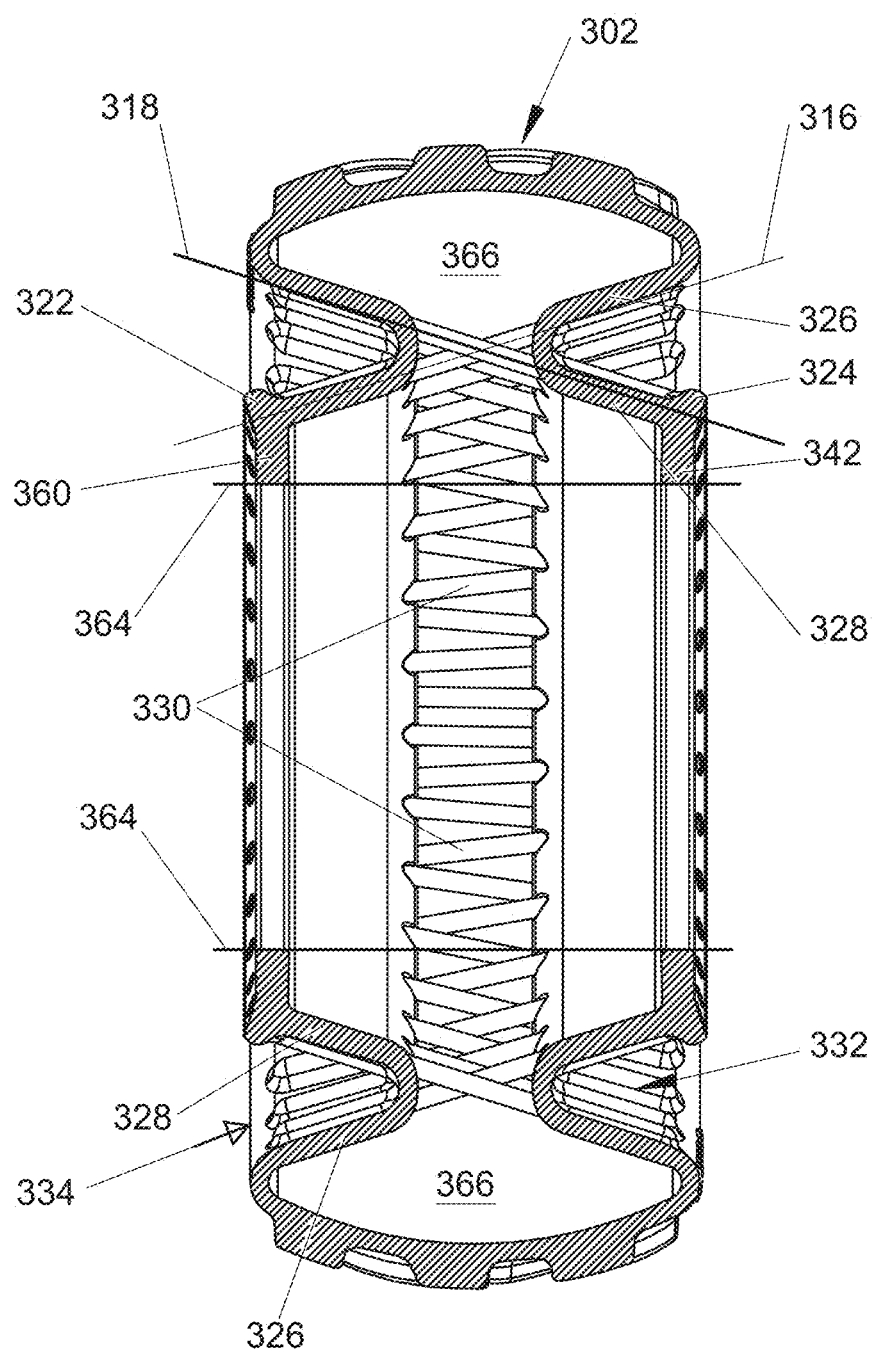

At ends 322 and 324 of the support arrangements, there are annular shoulders 360 and 362 for fitting over a hub (not shown) and represented by dotted lines 364 in FIG. 11C. Consequently, a circumferential enclosure 366 is formed, defined by the ground-engaging member 302, first and second portions 326 and 328 and between the hub. The enclosure 366 may contain compressed gas, e.g. compressed air, and the pressure controls the overall configuration. At high pressure, the locomotion assembly will assume a circular, wheel-like configuration. Once the pressure is reduced, the wheel structure can compress and assume a flattened, non-circular configuration with more extensive locomotion surface.

Figure 11D:
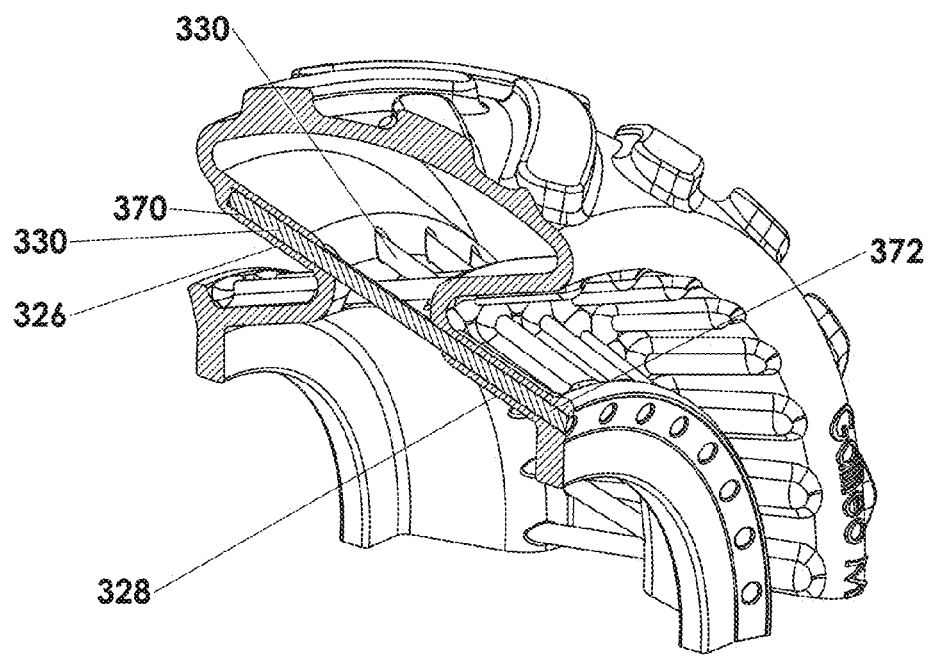
FIG. 11D is an enlarged section perspective view of a portion of the locomotion assembly.
Figure 11E:
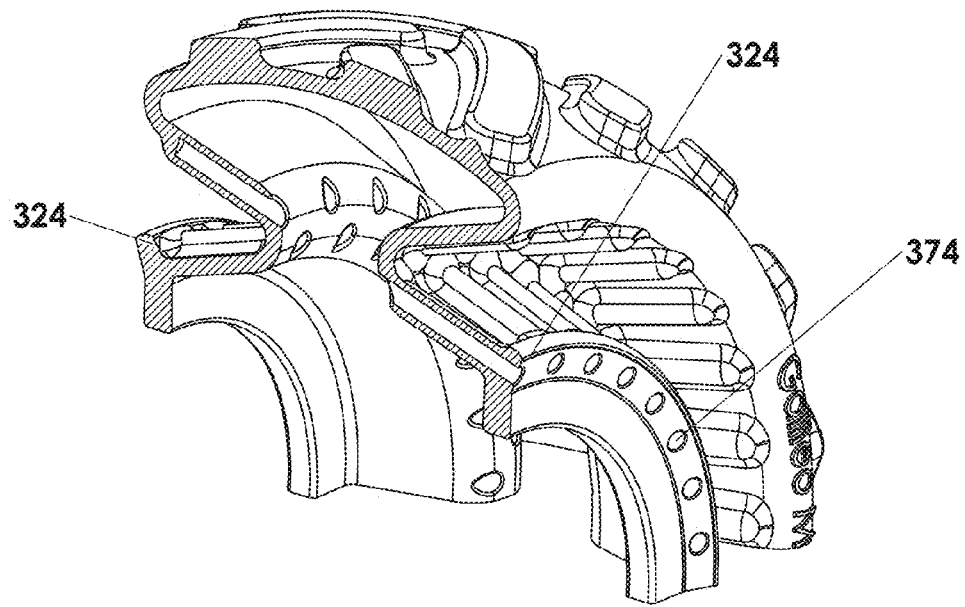
FIG. 11E shows a view of the same portion as that of FIG. 11D, without the spikes.

FIG. 11D shows a large section of the traction assembly with the spikes 330, each received within a cavity 370, formed within first portion 326; and bore 372, formed within second portion 328. As can be seen in FIG. 11E, showing the same view with the spikes removed, there is a plurality of openings 374 at end 324, through which the spikes can be inserted to pass through bore 372 and to be received also within cavity 370. The spikes provide a functional link defining first portion 326 and second portion 328 as belonging to one functional support arrangement. The spikes provide the rigidity to the support structure while the elastomeric portions provide the flexibility.

Figure 12A:
FIGS. 12A and 12B show a locomotion assembly of the kind shown in FIGS. 11A-11E, in a circular, wheel-like configuration and in a deformed flattened configuration, respectively.
Figure 12B:
Figure 13A:
FIGS. 13A and 13B show a tractor with rear locomotion assembly of the kind shown in FIGS. 12A-12B in the configurations of FIGS. 12A and 12B, respectively.
Figure 13B:

The locomotion assembly of the kind shown in FIGS. 11A-11E is shown in FIGS. 12A and 12B in the circular, wheel-like configuration and in a deformed, flattened configuration, respectively. A tractor with such a wheel in the same respective configurations is shown in FIGS. 13A and 13B.

The frustum-conical structure of the locomotion assembly of the invention may be configured from two or more elements made form any suitable material, iron or polymer for example, provided that this configuration defines frustum-conical geometry as described above.

Some of the above-described examples refer to the wheel structure utilizing a tube or another resilient enclosure. It should be understood that the invention is not limited to this specific implementation of the locomotion assembly. For example, FIGS. 14A and 14B illustrate a wheel structure which similar to that of FIGS. 10-11 utilizes engaging frustum-conical members, but in which, instead of using the tubular or the like resilient enclosure, the entire frustum-conical support structure 420 is formed from a suitable material, such as a sheet of steel.

It should be understood that using the frustum-conical structure formed by at least one frustum-conical member or preferably at least a pair of oppositely (substantially symmetrically) oriented frustum-conical support members, provides for transferring a force from the vehicle's axle to the surface engaging member via the frustum-conical support members. There are several ways for implementing a force transfer mechanism within the locomotion assembly.

In some of the embodiments described above, the support structure is formed by two frustum-conical support members, one being larger and actually providing the main support for the ground-engaging member and the other being smaller (shorter) and acting to induce the support structure to move in a linear direction, which otherwise (if formed by the single frustum-conical support member) would move in a radial direction, which is natural direction of rolling for a frustum-conical structure. In other words, the support structure is configured such that a bias of each of the support members of a pair to induce the surface engaging member to move in a non-linear direction is offset by the other support member of the pair.

In the above-described embodiments of FIGS. 10-11 and 14, the two frustum-conical support members are arranged in a so-called "crossing" fashion due to a gripping pattern (spikes) at the frustum-conical surfaces of the support members. Alternatively, the support structure may have no gripping pattern enabling engagement or crossing between the frustum-conical support members, but rather the frustum-conical members of the pair may be separate elements, e.g. spaced-apart from each other. This is exemplified in FIGS. 15A and 15B showing a frustum-conical structure 520 formed by a pair of oppositely oriented spatially separated members, having continuous frustum-conical surfaces. It should be understood that the support structures of FIGS. 14A-14B and 15A-15B may be embedded within an elastomeric matrix to form an inflatable wheel that can be fitted onto existing wheel drums.

The two frustum-conical support members of a pair may thus be either crossing (engaging) one another or separated, and may face each other by their identical wide ends or by their narrow ends (identical or not). For example, two frustum-conical members may be configured such that each of them is divided into two parts in a manner that there is no such region where segments of one frustum-conical member pass into the other frustum-conical member, but rather a small part of one member is coupled in a partial flexible manner to a larger part of the other oppositely oriented member. Generally speaking the configuration of the frustum-conical structure is such that an external circumferential part of the structure, which may be coupled (directly or not) to the surface-engaging member, executes coupling between the two oppositely oriented frustum-conical members, via their common axis, due to coupling between the other part of the structure to the vehicle's axle.

Those skilled in the art will readily appreciate that various modifications and changes can be applied to the embodiments of the invention as hereinbefore described without departing from its scope defined in and by the appended claims.

The invention claimed is:

1. A locomotion assembly of a vehicle, the locomotion assembly comprising:
   at least one surface-engaging member associated with a pneumatic actuating arrangement forcing the surface-engaging member to convert between a round configuration of a wheel, in which a side elevation thereof is substantially circular, and a deformed configuration, in which the side elevation is non-circular and in which a larger portion of the surface-engaging member is essentially parallel to a movement surface and in contact with the movement surface, and
   a frustum-conical structure comprising at least one pair of frustum-conical members, each having a frustum-conical annular surface extending between its relatively narrow and wide ends along a frustum-conical axis, said frustum-conical structure being configured as a support structure for said at least one surface-engaging member while being either coupled to or integral with said at least one surface-engaging member, said frustum-conical structure being reversibly deformable from a biased rounded shape into a deformed frustum-conical shape, in tandem with the conversion of the at least one surface-engaging member from the round configuration to the deformed configuration thereof,
   each of the frustum-conical members is configured with flexibility and rigidity such that the frustum-conical member is non-extendible in a circumferential dimension and is reversibly deformable from the biased rounded shape corresponding to a frustum-conical shape in which a side elevation of the frustum-conical member is circular into the deformed frustum-conical shape in which the side elevation of the frustum-conical member is non-circular,
   the frustum-conical members of the pair are arranged in a substantially symmetric manner and are rotatable about a common axis coinciding with frustum-conical axes thereof, each of the frustum-conical members of the pair by the relatively wide end thereof being linked to said at least one surface-engaging member and at least one of the frustum-conical members of the pair by the second relatively narrow end being rotationally fixed to an axle of the vehicle to permit rotation about said common axis.

2. The locomotion assembly of claim 1, wherein the frustum-conical structure is configured and operable such that a bias of each of the frustum-conical members of the pair to induce the surface engaging member to move in a non-linear direction is offset by the other frustum-conical member of the pair.

3. The locomotion assembly of claim 1, wherein the frustum-conical members of the pair are spatially separated along said common axis.

4. The locomotion assembly of claim 1, wherein each of the frustum-conical members of the pair comprises an array of slits along a side of the frustum-conical annular surface of the frustum-conical member forming a grid enabling engagement between the two frustum-conical members of said pair.

5. The locomotion assembly of claim 1, wherein the frustum-conical member of said pair of frustum-conical members has one of the following configurations: (i) the frustum-conical member is formed by a single frustum-conical element defining the respective frustum-conical annular surface; the frustum-conical member is formed by at least two frustum-conical elements defining together said frustum-conical annular surface.

6. The locomotion assembly of claim 1, wherein the frustum-conical members of the pair either jointly support at their wide ends the same surface-engaging member, or support two separate surface-engaging members respectively.

7. The locomotion assembly of claim 1, being intrinsically biased to assume a circular configuration.

8. The locomotion assembly of claim 1, being deformable to assume said non-circular configuration in response to a load on said axle.

9. The locomotion assembly of claim 1, wherein said pneumatic actuating arrangement comprises an enclosure for compressed gas, wherein the pressure of the gas controls the configuration of the locomotion assembly.

10. The locomotion assembly of claim 9, wherein a high gas pressure biases the locomotion assembly to assume the round configuration and a lowering of the gas pressure permits the locomotion assembly to assume the deformed non-circular configuration.

11. The locomotion assembly of claim 9, wherein the enclosure is annular.

12. The locomotion assembly of claim 1, wherein the at least one surface-engaging member has a surface-engaging surface with a first rim and a second rim corresponding to a first side and a second side of the locomotion assembly; the frustum-conical members of the pair being linked by their relatively wide ends to the first and second rims of the surface-engaging annular surface.

13. The locomotion assembly of claim 12, wherein the first frustum-conical member extends between the first rim of the surface-engaging member to the second side of the locomotion assembly and the second frustum-conical member of the pair extends between the second rim of the surface-engaging member to the first side of the locomotion assembly, the two frustum-conical members crossing one another at a mid-portion of the frustum-conical member.

14. The locomotion assembly of claim 12, comprising a circular, substantially V-shaped groove formed one at each side of the locomotion assembly, said groove having a first, more peripheral wall and a second, more central wall; the first wall constituting a first portion of one frustum-conical member and the second wall constituting a second portion of the other frustum-conical member.

15. The locomotion assembly of claim 14, wherein the first and second portions comprise an elastomer.

16. The locomotion assembly according to claim 15, comprising rigid spikes linking the first and the second portions and received in grooves, cavity or bores defined in the first and second portions.

17. The locomotion assembly of claim 12, wherein at least one first segment of each of the frustum-conical members is integral with the surface-engaging member.

18. The locomotion assembly of claim 1, wherein the relatively narrow ends of both of the frustum-conical members of the pair are linked to an axial hub.

19. The locomotion assembly of claim 1, wherein each of the frustum-conical members of the pair comprises a plurality of rigid spikes.

20. The locomotion assembly of claim 19, wherein the rigid spikes define together a mid-portion of the frustum-conical member linking between first and second end portions thereof.

21. The locomotion assembly of claim 20, wherein the first portion of each the two frustum-conical members is integral with the second portion of each of the other of the two frustum-conical members.

22. A vehicle comprising the locomotion assembly of claim 1.

23. A wheel for a land vehicle comprising:
an inflatable rubber tire defining an enclosed fluid-pressure holding space with a circumferential surface-engaging member; and
the locomotion assembly of claim 1 comprising said frustum-conical structure integrally formed in the wheel and supporting the inflatable rubber tire; each of the frustum-conical members being made from a rigid material and being flexible and biased into rounded shape in which its side elevation is circular and being reversibly deformable into a more flattened shape in which its side elevation is non-circular;
wherein deformation of the frustum-conical members permits the reversible deformation of the surface-engaging member from a substantially circular shape to a deformed shape in which a larger portion of the ground-engaging surface is in contact with the surface.

24. The locomotion assembly of claim 1, wherein the frustum-conical members of the pair are axially spaced from one another along said common axis.

25. The locomotion assembly of claim 1, wherein said at least one of the frustum-conical members of the pair comprises an end cap connected to the second relatively narrow end, and the end cap is configured to be rotationally directly fixed to the axle.

26. A locomotion assembly of a vehicle, the locomotion assembly comprising:
at least one surface-engaging member associated with a pneumatic actuating arrangement forcing the surface-engaging member to convert between a round configuration of a wheel, in which a side elevation thereof is substantially circular, and a deformed configuration, in which the side elevation is non-circular and in which a larger portion of the surface-engaging member is essentially parallel to a movement surface and in contact with the movement surface, the surface-engaging member having a surface-engaging surface with a first rim and a second rim corresponding to a first side and a second side of the locomotion assembly, and a frustum-conical structure coupled to the at least one surface-engaging member for supporting the at least one surface-engaging member and reversibly deformable from a biased rounded shape into a deformed frustum-conical shape, in tandem with the conversion of the at least one surface-engaging member from the round configuration to the deformed configuration thereof, the frustum-conical structure comprising at least one pair of frustum-conical members, each of the frustum-conical members configured with flexibility and rigidity such that the frustum-conical member is non-extendible in a circumferential dimension and is reversibly deformable from the biased rounded shape corresponding to a frustum-conical shape in which a side elevation of the frustum-conical member is circular into the deformed frustum-conical shape in which the side elevation of the frustum-conical member is non-circular, the frustum-conical members of the pair being arranged in a substantially symmetric manner and being rotatable about a common axis coinciding with frustum-conical axes thereof, each of the frustum-conical members of the pair having a first relatively wide end and a second relatively narrow end, the frustum-conical members of the pair being linked by their relatively wide ends to the first and second rims of the surface-engaging surface, and being by their relatively narrow ends rotationally fixed to an axle of the vehicle to permit rotation about said common axis, said frustum-conical structure formed by the at least one pair of the frustum-conical members defining a circular, substantially V-shaped groove formed one at each side of the locomotion assembly, said groove having a first, more peripheral wall constituting a first portion of one frustum-conical member and a second, more central wall constituting a second portion of the other frustum-conical member.

27. A locomotion assembly of a vehicle, the locomotion assembly comprising:

at least one surface-engaging member associated with a pneumatic actuating arrangement forcing the surface-engaging member to convert between a round configuration of a wheel, in which a side elevation thereof is substantially circular, and a deformed configuration, in which the side elevation is non-circular and in which a larger portion of the surface-engaging member is essentially parallel to a movement surface and in contact with the movement surface, and a frustum-conical structure comprising at least one pair of oppositely oriented frustum-conical members, each having a frustum-conical annular surface extending between its relatively narrow and wide ends along a frustum-conical axis, the frustum-conical annular surfaces being oppositely oriented with respect to one another, said frustum-conical structure being configured as a support structure for said at least one surface-engaging member while being integral with said at least one surface-engaging member, said frustum-conical structure being reversibly deformable from a biased rounded shape into a deformed frustum-conical shape, in tandem with the conversion of the at least one surface-engaging member from the round configuration to the deformed configuration thereof, a rigid hub integrally connected to the frustum-conical structure and configured to be directly rotationally fixed to an axle of the vehicle to transfer torque from the vehicle to the location assembly, each of the frustum-conical members is configured with flexibility and rigidity such that the frustum-conical member is non-extendible in a circumferential dimension and is reversibly deformable from the biased rounded shape corresponding to a frustum-conical shape in which a side elevation of the frustum-conical member is circular into the deformed frustum-conical shape in which the side elevation of the frustum-conical member is non-circular, the frustum-conical members of the pair are arranged in a substantially symmetric manner and are rotatable about a common axis coinciding with frustum-conical axes thereof, each of the frustum-conical members of the pair having a first leg that extends from the relatively wide end thereof to the second relatively narrow, the first leg being integrally connected to said at least one surface-engaging member, and a second leg that extends from the second relatively narrow end to the rigid hub, the second leg being integrally connected to the rigid hub.

* * * * *